Figure 1:
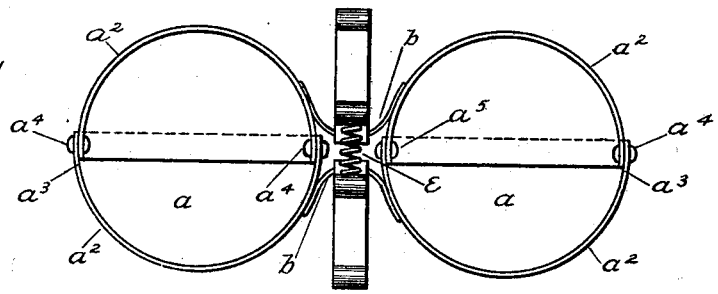

No. 703,783. Patented July 1, 1902.
L. H. GRISTE.
CULINARY DEVICE.
(Application filed Feb. 21, 1902.)
(No Model.)

WITNESSES
F. A. Stewart
F. F. Teller

INVENTOR
Laura H. Griste
BY
Edgar Tate & Co
ATTORNEYS

UNITED STATES PATENT OFFICE.

LAURA H. GRISTE, OF NEW YORK, N. Y.

CULINARY DEVICE.

SPECIFICATION forming part of Letters Patent No. 703,783, dated July 1, 1902.

Application filed February 21, 1902. Serial No. 95,016. (No model.)

*To all whom it may concern:*

Be it known that I, LAURA H. GRISTE, a citizen of the United States, residing at New York, in the county of New York and State of New York, have invented certain new and useful Improvements in Culinary Devices, of which the following is a full and complete specification, such as will enable those skilled in the art to which it appertains to make and use the same.

The object of this invention is to provide an improved culinary article which is designed for use in poaching eggs and which is simple in construction and operation and by means of which eggs may be conveniently and quickly poached; and with this and other objects in view the invention consists in a device of the class specified constructed as hereinafter described and claimed.

The invention is fully disclosed in the following specification, of which the accompanying drawings form a part, in which the separate parts of my improvement are designated by the same reference characters in each of the views, and in which—

Figure 2:
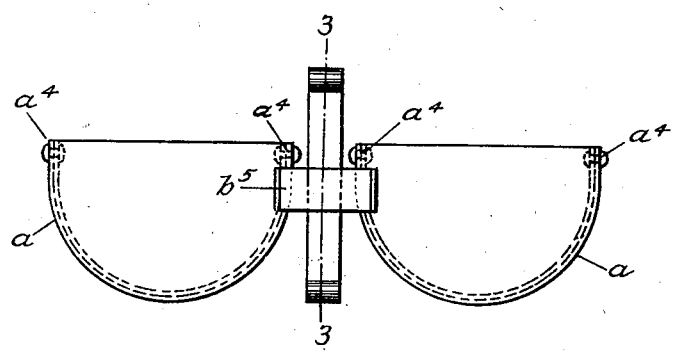

Figure 1 is a plan view of my improved culinary device; Fig. 2, a side view thereof, and Fig. 3 a partial section on the line 3 3 of Fig. 2.

In the practice of my invention I provide a device of the class specified comprising in its construction two similar cup-shaped body portions $a$, which are divided centrally and vertically into two similar parts $a^2$, and one of these parts is slightly less in transverse diameter than the other, so that one of said parts will enter the other of their adjacent edges, as clearly shown at $a^3$, and said parts are riveted together at the opposite sides and at the top thereof, as shown at $a^4$.

Figure 3:
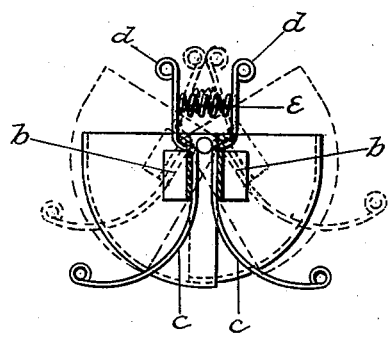

Connected with the opposite parts $a^2$ of each of the separate members $a$ of the device and near the top portion thereof are inwardly-curved plates or supports $b$, to each of which is secured a vertically-arranged leg or support $c$, and these legs or supports are curved downwardly and outwardly, as clearly shown in Fig. 3, and are provided with an outwardly and upwardly directed handle portion $d$, and between the handle portions $d$ of the legs $c$ is placed a spring $e$, which normally operates to hold the legs and handles $c$ and $d$ in the position shown in Fig. 3, in which position the separate parts $a^2$ of the cup-shaped members $a$ are close together, as shown in Fig. 1 and in full lines in Fig. 3.

In the operation of poaching eggs the said device is sunk or partially sunk into hot water and the handle portions $d$ are pressed together, so as to separate the bottom portion of the separate parts $a^2$ of the cup-shaped members $a$, and the hot water passes into said cup-shaped members, after which the spring $e$ is allowed to operate and force said parts $a^2$ together at the bottom. The eggs are then dropped into the cup-shaped members $a$, and the device is held in the water by means of the handle $d$ until the eggs are poached, after which the device is lifted from the water and the handles $d$ are again pressed, so as to allow the water to run from the cup-shaped members $a$, but retain the eggs therein, and after all the water has been discharged the eggs may be deposited on a plate or other receiver by simply compressing the handles $d$, which operation opens the bottom of the receptacle $a$ and allows the eggs to drop therefrom.

This device is simple in construction and operation and perfectly adapted to accomplish the result for which it is intended, and changes in and modifications of the construction herein described may be made without departing from the spirit of my invention.

Having fully described my invention, what I claim as new, and desire to secure by Letters Patent, is—

1. A culinary device comprising two similar cup-shaped receptacles divided centrally and vertically into two similar parts, the edges of one of which are adapted to fit within the corresponding edges of the other, the parts of said receptacles being also pivoted together at the top portion thereof, and at the opposite sides, transverse and horizontally arranged members which connect the said receptacles at the top portion thereof, and legs connected with said members, and provided with upwardly-directed handles, and a spring placed between said handles, substantially as shown and described.

2. A device of the class described comprising two similar cup-shaped receptacles composed of two similar parts, the edges of one of which fit within the edges of the other, and said parts being pivotally connected at the opposite sides at the top thereof, transversely-arranged members which connect the separate parts of said receptacles near the top thereof, and legs connected with said members and projecting above the same to form handles, substantially as shown and described.

3. A culinary device comprising a cup-shaped receptacle divided centrally and vertically into two similar parts, the edges of one of which are adapted to fit within the corresponding edges of the other, the parts of the receptacle being also pivoted together at the top portion thereof, means for holding the separate parts of the receptacle together and handles whereby the receptacle may be manipulated and the separate parts separated at the bottom, substantially as shown and described.

4. A device of the class described comprising a plurality of cup-shaped receptacles divided vertically into corresponding parts which are pivotally connected and the edges of which are adapted to fit one within the other, means for holding the separate parts of said receptacles together and means whereby the said receptacles may be manipulated and the separate parts thereof separated at the bottom, substantially as shown and described.

In testimony that I claim the foregoing as my invention I have signed my name, in presence of the subscribing witnesses, this 19th day of February, 1902.

LAURA H. GRISTE.

Witnesses:
F. A. STEWART,
F. F. TELLER.